(12) United States Patent
Savage et al.

(10) Patent No.: US 6,560,779 B1
(45) Date of Patent: May 13, 2003

(54) PERSONAL PET DRYER ATTACHMENT

(76) Inventors: Wilton A. Savage, 10939 Valley Spring Dr., Charlotte, NC (US) 28277; Adele R. Savage, 10939 Valley Spring Dr., Charlotte, NC (US) 28277

( * ) Notice: Subject to any disclaimer, the term of this patent is extended or adjusted under 35 U.S.C. 154(b) by 0 days.

(21) Appl. No.: 10/287,044

(22) Filed: Nov. 4, 2002

(51) Int. Cl.[7] ................................................. A41D 6/00
(52) U.S. Cl. ............................................................. 2/1
(58) Field of Search ................................ 2/1, 456, 457, 2/69, 901, DIG. 1, DIG. 3; 119/606, 678, 671, 672, 673, 677, 668; 132/271; 34/90, 283

(56) References Cited

U.S. PATENT DOCUMENTS

| | | | | |
|---|---|---|---|---|
| 3,108,568 A | * | 10/1963 | Whitney et al. | 119/174 |
| 3,150,641 A | * | 9/1964 | Kesh | 119/678 |
| 3,263,653 A | * | 8/1966 | Miller | 119/673 |
| 3,596,636 A | * | 8/1971 | Stobaugh | 119/174 |
| 4,559,903 A | * | 12/1985 | Bloom et al. | 119/416 |
| 4,796,567 A | * | 1/1989 | Allan et al. | 119/678 |

\* cited by examiner

*Primary Examiner*—Gloria M. Hale
*Assistant Examiner*—Tejash Patel

(57) ABSTRACT

A personal pet blow dryer attachment which enables the delivery of heated air to dry the wet coat of a pet without manual intervention of a handler during the drying process. The personal pet blow dryer attachment is comprised of a body wrap and a mounting station. The body wrap serves as a diffuser for heated air and is connected to a blow dryer with a flexible tube. The body wrap is also connected to the mounting station, or cage to stabilize and secure the pet during the drying process. Heated air is delivered to the pet through the body wrap, via a plurality of holes for air passage. In use the unique body wrap directs heated air across the surface of the pet, such that the heated air dries virtually every surface of the pet's coat simultaneously. As a result, the invention enables drying the pet's coat in a relatively short period of time.

5 Claims, 4 Drawing Sheets

PERSONAL PET DRYER ATTACHMENT

DESCRIPTION

BACKGROUND—Field of Invention

The current invention generally relates to a hair/fur dryer attachment for pets, and is specifically directed to a personal pet drying attachment comprising of a body wrap and a mounting station for drying the wet coat of a pet enclosed with the body wrap, enabling hands free operation.

BACKGROUND—Description of Prior Art

All types and breeds of pets, traditionally dogs, get dirty and require periodic grooming of the hair/fur on the pet's coat. This grooming process generally includes shampooing, drying, trimming the hair and combing the loosened hair/fur. Using a mechanical drying device dries pets quicker, thus substantially reducing the entire grooming process time. Numerous types of dryers have been employed to dry these pets with differing results and limitations.

The basic types of pet dryers are hand held, stationary and cage. Hand held pet dryers, similar to those commonly sold for use by people, require the groomer to move the dryers rapidly over the pet to dry the entire pet's coat. Although the pet does get thoroughly dry in a controlled environment, this method is time consuming, inefficient and labor intensive.

Another type of pet dryer uses a pouch affixed to a stationary object. The pouch contains holes that allow heated air from a connected a blow dryer to dry the pet by holding the pet beneath the holes. Even though the pet does get dry, this method is again time consuming, inefficient and labor intensive.

Cage dryers generally blow heated air into the cage from a fan blower aimed from the top, the side(s), the bottom of the cage or some combination of each. These cage type dryers adequately address the high labor requirement of the hand held dryers, but present other issues. In use, a shampooed pet is placed inside the cage, a fan blower then blows heated air through a wire mesh cage door, cage side, cage top or cage bottom into the cage, to dry the pet without human intervention.

Another type cage dryer operates without heating the air blown onto the pet animal. This dryer uses two independent fans, mounted on opposing side walls of the cage, creating a turbulent airflow throughout the entire cage. When in use the shampooed pet is placed inside the cage and the entire interior region of the cage receives the turbulent air flow, thus increasing the possibility of a more thoroughly dried pet.

The principle disadvantages of cage dryer applications are that since the air flow is not directionally controlled, each blows air over the entire pet's body, without regard to vital organs. Air is blown directly into the pet's eyes, nose, ears and mouth causing both discomfort and anxiety. Additionally, a potential health hazard exists since a foreign particle can become airborne and get blown into one of these organs. Furthermore, since the airflow is not directionally controlled, parts of the pet animal's coat do not get thoroughly dried. Also, with the exception of one cage dryer, these cage dryer applications use heated air, which can cause pets to develop hypothermia (fatal overheating) and/or suffer dehydration while being completely enclosed in a totally heated environment. The current invention solves these and other issues.

SUMMARY OF THE INVENTION

In view of the limitations of prior art for pet dryers, the current invention provides a new and improved pet drying system. A personal pet dryer attachment comprising of a body wrap and a mounting station for the drying of the wet coat of a pet enclosed by the apparatus. When used, the blow dryer directs heated air into the body wrap which disperses the air onto the pet's wet coat thereby drying substantially every surface of the pet's coat at the same time. This method allows the pet's coat to be dried without any manual intervention on the part of the owner or groomer during the drying process.

OBJECTIVES

It is an objective of this invention to provide an improved pet drying system. Accordingly, several objectives are:

1.) to provide a attachment for a pet drying application which will fit an existing human blow dryer;
2.) to provide a blow dryer attachment which efficiently dries the pet's coat eliminating manual human intervention;
3.) to provide a blow dryer attachment apparatus that will secure the pet during the drying process;
4.) to provide a blow dryer attachment which dries the pet in relatively short period of time.

In the preferred embodiment of the present invention, the personal pet dryer attachment comprises a body wrap having a drying surface area capable of covering a pet. The blow dryer is attached to the body wrap and supplies the heated air, which is blown via a delivery tube into the body wrap to dry the pet. The air flowing into the body wrap is dispersed to substantially the entire body of the pet animal, thus drying virtually every surface of the pet's coat at the same time.

The present invention will be better understood from the following detailed description of the preferred embodiment of the present invention. Read the descriptions in connection with the drawings as hereinafter described.

DRAWING FIGURES

FIG. 1 is a top view of the blow dryer attachment for pets incorporating the invention.

FIG. 2 is a bottom view of the blow dryer attachment for pets incorporating the invention.

FIG. 3 is a side view of the blow dryer attachment for pets showing the flexible tube which directs the air flow from a blow drying source.

FIG. 4 is a bottom view of the blow dryer attachment showing the body wrap's plurality of holes.

FIG. 5 is a side view of the blow dryer attachment for pets incorporating the invention showing its application to a pet.

FIG. 6 is a side view of the blow dryer attachment for pets incorporating the invention showing the invention secured to a pet fastened inside a cage, kennel or crate.

FIG. 7 is a side view of the blow dryer attachment for pets incorporating the invention showing the invention secured to a pet and fastened to the mounting station.

REFERENCE NUMERALS IN THE DRAWINGS 8 body wrap
9 body wrap hooks
10 aperture
11 body wrap straps
12 plurality of holes for air passage 13 flexible tube
14 pet cage, kennel or crate
15 mounting station

Figure 1:
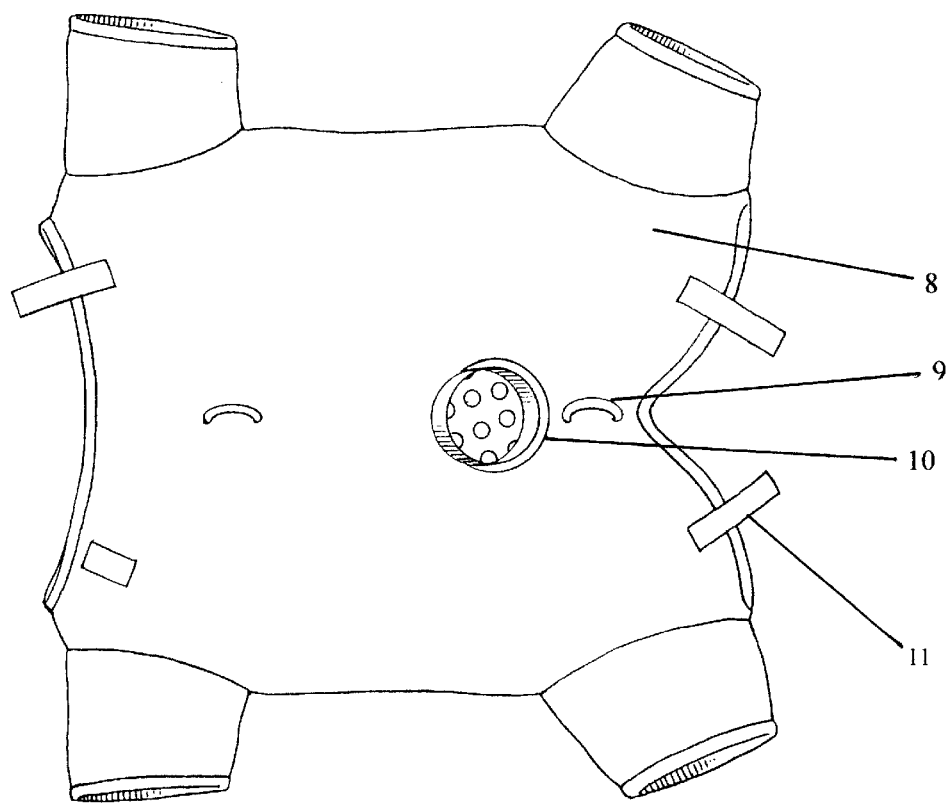
FIG. 1 shows the body wrap 8 which serves as a manifold for the heated air. The body wrap 8 is connected to a blow dryer via the flexible tube through the body wrap's aperture 10. The body wrap 8 securely encapsulates the pet with the body wrap straps 11. The top of the body wrap is secured to the pet securement mounting station with the body wrap hooks 9.
Figure 2:
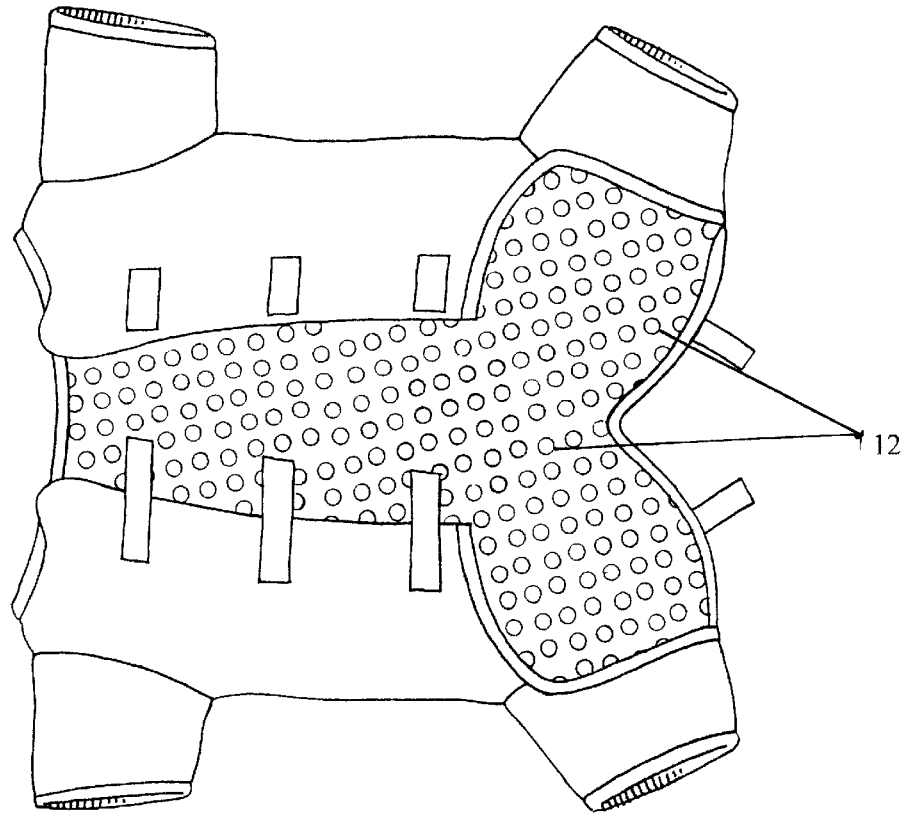
Figure 3:
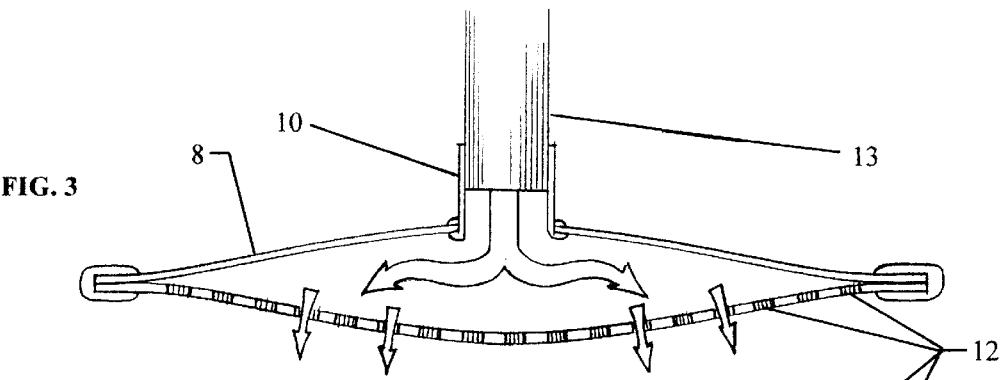
FIG. 3 shows the body wrap 8 which serves as a manifold for the heated air. The body wrap 8 is connected to a blow dryer via the flexible tube 13 through the body wrap's aperture 10. Heated air is supplied to the pet from the body wrap via a plurality of holes 12 for air passage to dry the pet.
Figure 4:
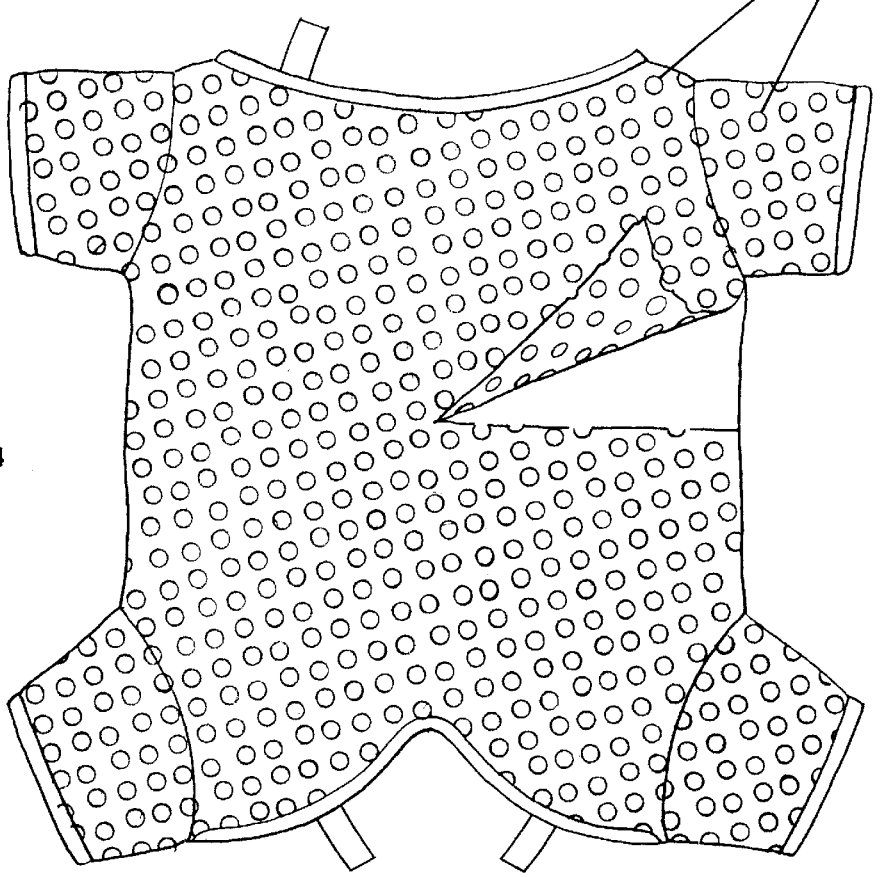
Figure 5:
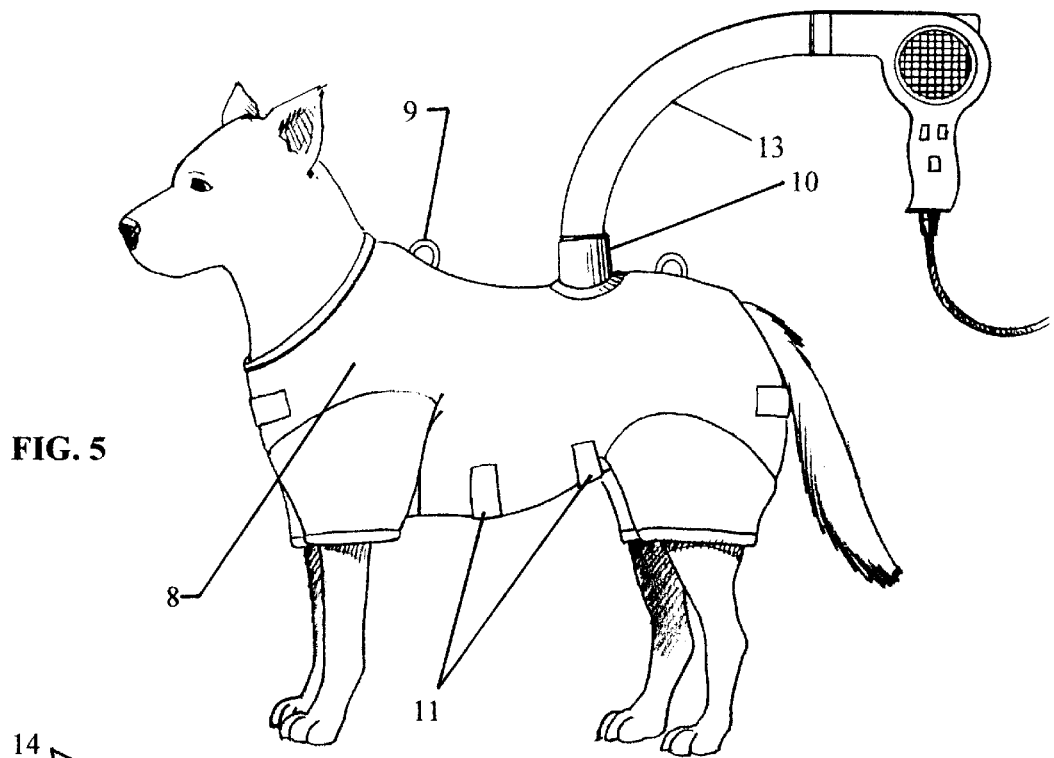
FIG. 5 shows the body wrap 8 which serves as a manifold for the heated air. The body wrap 8 is connected to a blow dryer via the flexible tube 13 through the body wrap's aperture 10. The body wrap securely encapsulates the pet with the body wrap straps 11. The top of the body wrap is secured to a pet cage, kennel or crate 14 with the body wrap hooks 9 as seen in FIG. 6 and the mounting station as seen in FIG. 7. Heated air is supplied to the pet from the body wrap via a plurality of holes for air passage to dry the pet.
Figure 6:
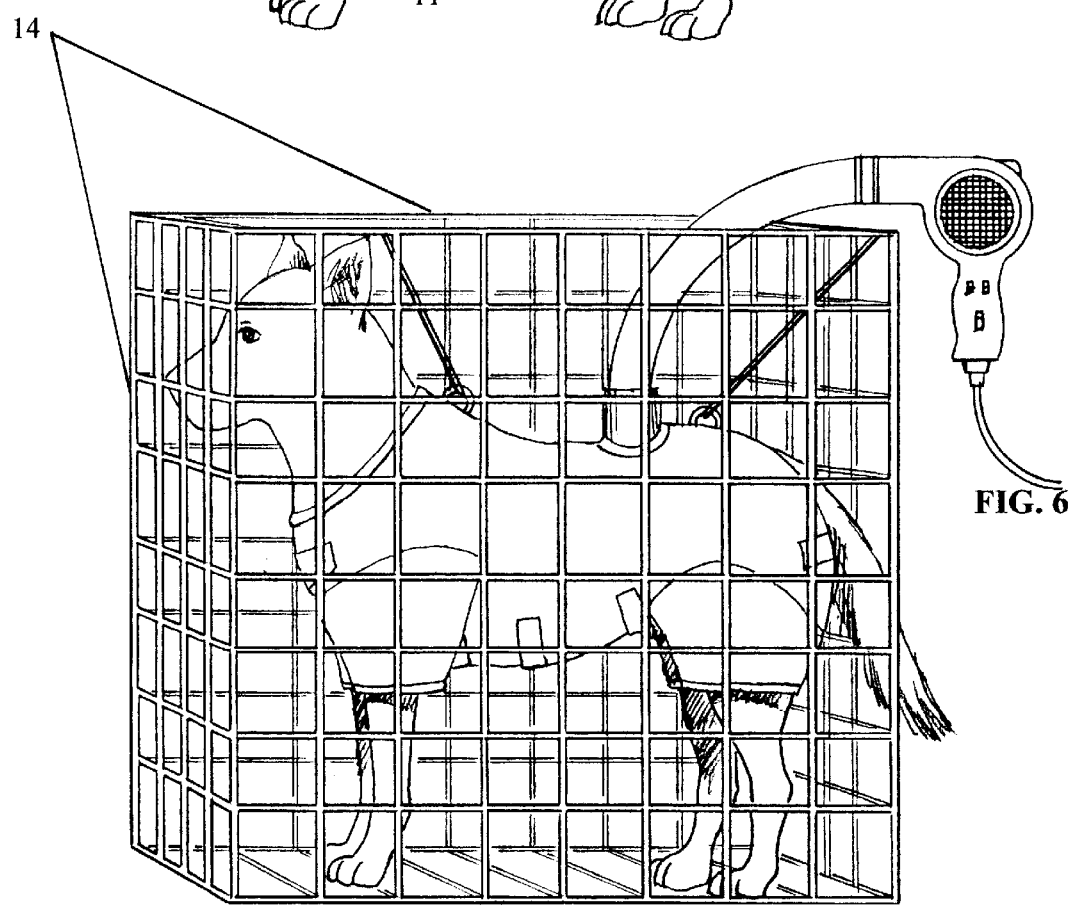
Figure 7:
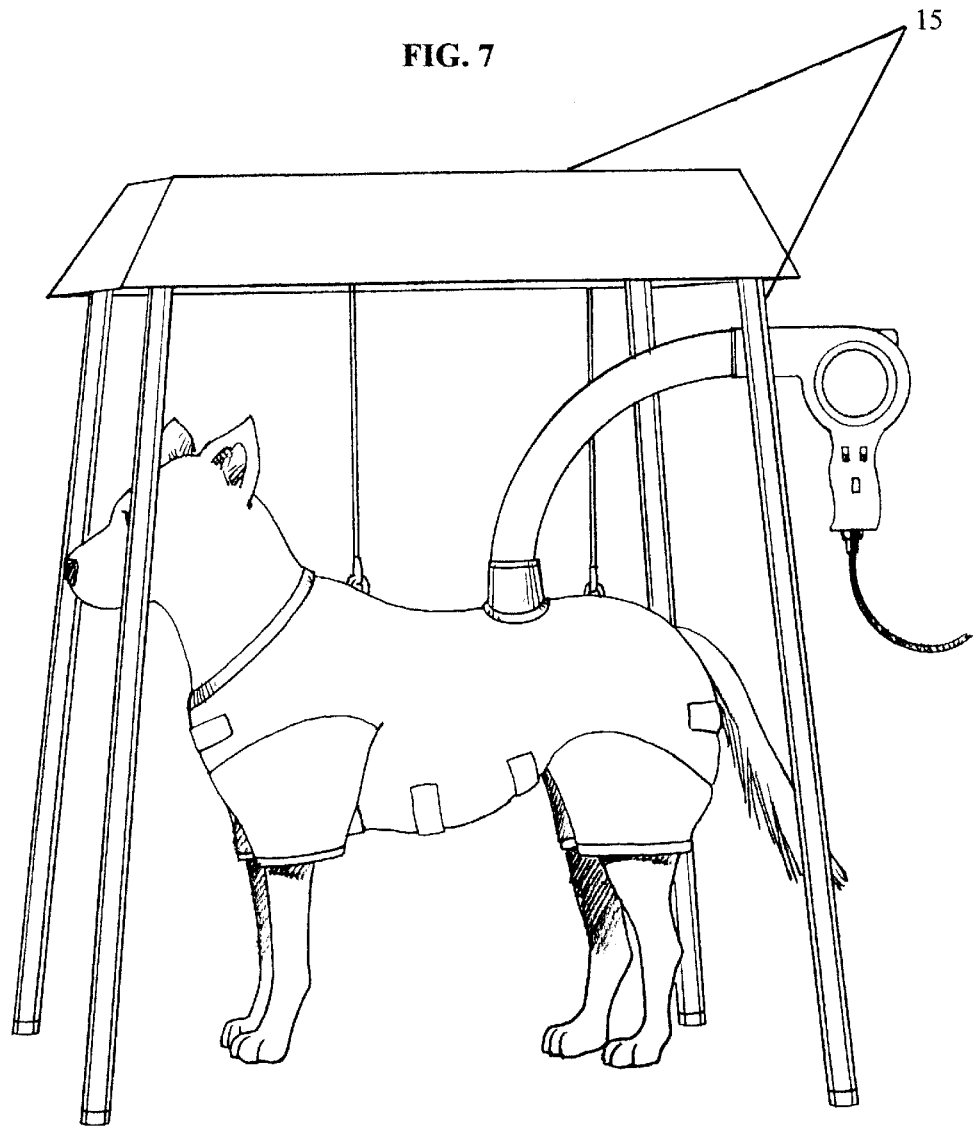

The above invention has been described and illustrated in detail with regard to the preferred embodiment. However, it includes many specificities and they should not be interpreted as limits on the scope of the invention. Other variations of the invention are possible for example, the size, shape and form of the body wrap and the positioning and/or size of the holes may be altered to accommodate varying sizes and shapes of pets. Additionally, the type material(s) and method(s) for constructing the body wrap may consist of a variety of combinations of substances and construction methods without deviating from the scope of this invention. Therefore, the scope of this invention should be determined by the appended claims and their legal equivalents and not to the specific structure(s) or arrangement(s) of parts described and illustrated hereinabove.

What is claimed, is:

1. A combination pet securement station and a personal pet dryer attachment for drying the wet coat of a pet contained with a body wrap assembly, said body wrap assembly comprising:

(a) a body wrap to encapsulate a pet; and
    (b) a means to secure the body wrap to the pet; and
    (c) a pet securement station to stabilize and secure the pet; and
    (d) a means to attach a blow dryer to the body wrap and means for attaching the body wrap to the pet securement station, wherein a blow dryer operatively directs air into the body wrap to create airflow via a plurality of holes within the body wrap to dry said pet's coat.

2. The combination of claim 1, wherein the means to secure the body wrap included body straps.

3. The combination of claim 1, wherein the means to attach the body wrap includes hooks.

4. The combination of claim 1, wherein the means to attach the blow dryer includes a flexible tube.

5. The combination of claim 1, wherein the pet securement station includes any one of a mounting station, a cage, kennel, or crate.

\* \* \* \* \*